Figure 1:
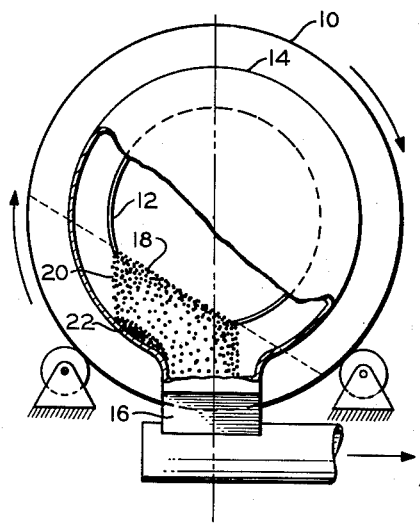

March 31, 1964    B. F. LOEWEN      3,126,577
APPARATUS FOR HANDLING PELLETS OF
POWDERED MATERIAL
Filed May 26, 1961

INVENTOR.
B. F. LOEWEN
BY *Hudson & Young*
ATTORNEYS

United States Patent Office 3,126,577
Patented Mar. 31, 1964

3,126,577
APPARATUS FOR HANDLING PELLETS OF
POWDERED MATERIAL
Bruno F. Loewen, Borger, Tex., assignor to Phillips
Petroleum Company, a corporation of Delaware
Filed May 26, 1961, Ser. No. 112,961
5 Claims. (Cl. 18—1)

This invention relates to apparatus for handling pellets of powdered material such as carbon black.

In both the pelleting of loose carbon black and the drying of carbon black pellets, it is conventional to pass the material thru a cylindrical drum rotating on its axis in horizontal position so that the effluent pellets fall from the end of the drum or from an outlet conduit in the end thereof into a hood communicating with the end of the drum or outlet conduit. The hood is stationary and is provided with a delivery conduit depending from the bottom thereof and leading to a conveyor for conveying the pellets to further processing, to storage, or to packaging. The delivery conduit is positioned with its axis in the vertical plane thru the axis of the drum. This is a so-called on-center position of the delivery conduit. In this apparatus arrangement, which is illustrated in U.S. Patent 2,948,918, issued to O. K. Austin, and 2,890,942, issued to G. J. Webster et al., the pelleted material falls on the inner wall of the hood adjacent the delivery conduit because of the rotation of the drum and delivery of pellets thereto from the section of the drum moving upwardly from its lowermost position. The falling of the pellets onto the hood wall results in scale build-up which deflects pellets into the space or seal between the rotating drum and hood or between the connecting conduit and the stationary hood. This not only wastes a substantial amount of product but also requires shutdown and appreciable man-hours of cleaning the material from the hood wall.

This invention is concerned with an apparatus arrangement of a rotating drum and stationary hood with its delivery conduit which avoids the foregoing disadvantages in currently used equipment. While the discussion of the invention refers specifically to carbon black, it is to be understood that the invention is also applicable to pelleting and drying of wet pellets of other powdered materials, such as catalyst powders, adsorbents, etc.

Accordingly, an object of the invention is to provide an improved arrangement of apparatus for handling pellets of powdered material. Another object is to provide an apparatus arrangement for use in the pelleting of powdered materials or in the drying of wet pellets of powdered materials which avoids breakage of pellets and build up of scale in the apparatus. A further object is to improve the economics of pellet handling. Other objects of the invention will become apparent to one skilled in the art upon consideration of the accompanying disclosure.

In accordance with a broad aspect of the invention, the delivery conduit depending from the bottom of the hood in a pelleting mill or a pellet dryer, is positioned with its vertical axis outside of the vertical plane thru the axis of the drum with which the hood is associated or at least so that its upright walls are laterally outside of the curtain of falling pellets. This results in an off-center position of the delivery conduit whereby the curtain of pellets falling from the outlet, or outlet conduit, leading from the drum gravitates directly into the delivery conduit without striking the wall of the hood. This apparatus arrangement avoids destruction of pellets and buildup of material on the hood wall, thereby greatly improving the economics of the process involved.

Figure 2:
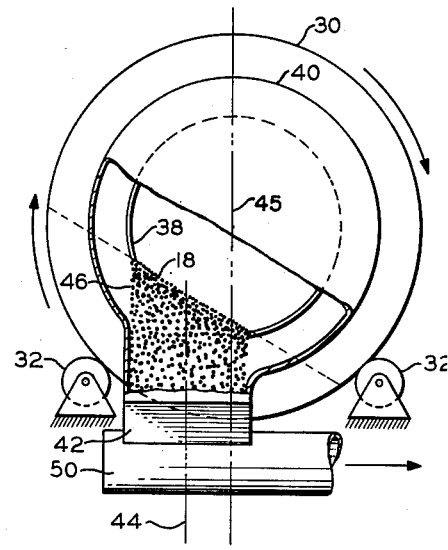
Figure 3:
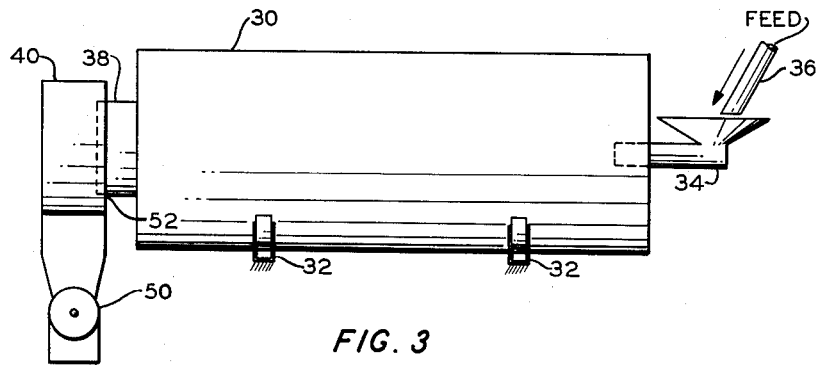
Figure 4:
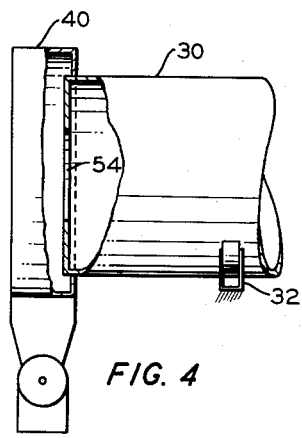

A more complete understanding of the invention may be had by reference to the accompanying schematic drawing of which FIGURE 1 is an end elevation of the downstream end of conventional pellet drying or pellet forming apparatus wherein pelleted material falls onto the hood wall adjacent the delivery conduit; FIGURE 2 is a view similar to FIGURE 1, illustrating a preferred apparatus arrangement in accordance with the invention; FIGURE 3 is a side elevation of apparatus arranged in accordance with the invention; and FIGURE 4 is a fragmentary view of the delivery end of a drum showing another arrangement of hood and drum.

Referring to FIGURE 1, a pelleting mill or dryer drum 10 has an outlet conduit 12 fixed to the delivery end of the drum. A stationary hood 14 encloses the downstream end of conduit 12. A delivery conduit 16 connects with the bottom of hood 14 and is positioned with its center line directly below the center of the drum or in the vertical plane passing thru the axis of drum 10. Drum 10 and conduit 12 rotate clockwise so that the pellet bed 18 in the drum and in conduit 12 rides the drum and conduit up the sides of these elements so that the pellets fall from the downstream lip of conduit 12 as shown by dash lines 20, thereby striking the bottom of the hood and forming scale or cake 22 thereon.

In FIGURES 2 and 3, drum 30 is rotatably supported by wheels or rollers 32 for rotation in clockwise direction. A feed conveyor 34, receiving feed material from conduit 36, projects into drum 30 at the upstream end. An outlet conduit 38 is rigidly attached to the delivery end of the drum coaxially therewith and leads into a hood 40 which closely fits the exterior of conduit 38. Conventional buckets (not shown) in the downstream end of drum 30 pick up pellets therein and feed them into outlet conduit 38. A delivery conduit 42 is dependently attached to the bottom of hood 40 so that its center line 44 is substantially outside of center line 46 of drum 30. Since the rotation of the drum is clockwise, viewing same from the delivery end, pellet bed 18 rides up the left side of drum 30 and outlet conduit 38 so that pellets gravitate in a curtain 46 from the downstream lip of drum 38 to the left of center line 46. By placing delivery conduit 42 off center to the left, the gravitating pellets fall directly into conduit 42 and onto conveyor 50 for transfer to storage, packaging, or further processing. In this way the striking of pellets against the bottom wall of the hood is avoided which eliminates the disadvantages of pellet breakage and buildup of scale on the hood wall, and, also, the escape of pellets and broken pellets thru the joint or seal between hood 40 and conduit 38, as indicated at 52 in FIGURE 3.

The amount of offset of delivery conduit 42 is dependent upon the diameter of this conduit, the rotation speed of the drum, and the depth of pellets in the drum. It is essential that the walls of delivery conduit 42 be outside the curtain of falling pellets in order to avoid breakage, buildup of scale, and leakage of material between the hood and the drum or outlet conduit.

FIGURE 4 shows an arrangement of a drum 30 and hood 40 wherein the hood surrounds the delivery end of drum, directly. The pellet outlet in the delivery end of the drum is indicated at 54.

The invention has been installed in a wet pelleting carbon black plant on all of the dryer hoods therein. The old delivery or drop-out conduits were removed and replaced by offset conduits which allow the pellets to fall directly onto an existing vibratory conveyor. The new arrangement has entirely eliminated the building up of carbon black on the hood wall adjacent the delivery or drop-out conduit and the entrapment and crushing of pellets between the hood and outlet conduit from the dryer drum with leakage of resulting fines to the atmosphere.

Certain modifications of the invention will become apparent to those skilled in the art and the illustrative details disclosed are not to be construed as imposing unnecessary limitations on the invention.

I claim:

1. Apparatus for handling pellets of powdered material, such as carbon black, comprising in combination a cylindrical drum having an inlet for said material at one end and an axial outlet at the other end thereof, said outlet leading over a ring coaxial with said drum; means for supporting and rotating said drum with its axis in substantially horizontal position; a stationary hood adjacent said outlet and communicating therewith, whereby the rotation of said drum when delivering pellets into said hood forms a curtain of gravitating pellets offset in the direction of rotation from a perpendicular plane along said axis; a delivery conduit depending from said hood for receiving said pellets, said conduit being offset in the direction of offset of said curtain of pellets so as to allow same to gravitate directly into said conduit and avoid impinging on said hood.

2. The apparatus of claim 1 wherein the vertical center line of said delivery conduit is spaced a substantial distance from said plane.

3. The apparatus of claim 1 wherein said hood encloses the delivery end of said drum.

4. The apparatus of claim 1 including a cylindrical outlet conduit coaxial with said drum and extending into said hood from the outlet of said drum, said delivery conduit receiving pellets from the downstream lip of said outlet conduit.

5. The apparatus of claim 1 wherein the downstream end of said drum is completely open so that pellets gravitate over the lip of said drum into said conduit.

References Cited in the file of this patent
UNITED STATES PATENTS

| | | |
|---|---|---|
| 1,528,851 | Rodling et al. | Mar. 10, 1925 |
| 1,994,718 | Lellep | Mar. 19, 1935 |
| 2,707,304 | Haley | May 3, 1955 |
| 2,828,190 | King | Mar. 25, 1958 |
| 2,872,300 | Pollack | Feb. 3, 1959 |
| 2,890,942 | Webster et al. | June 16, 1959 |
| 2,948,918 | Austin | Aug. 16, 1960 |